United States Patent

Kimura

Patent Number: 5,260,569
Date of Patent: Nov. 9, 1993

[54] SCANNING MICROSCOPE AND SCANNING MECHANISM

[75] Inventor: Toshihito Kimura, Kanagawa, Japan

[73] Assignee: Fuji Photo Film Co., Ltd., Kanagawa, Japan

[21] Appl. No.: 905,872

[22] Filed: Jun. 29, 1992

[30] Foreign Application Priority Data

Jul. 25, 1991 [JP] Japan ................... 3-186190

[51] Int. Cl.⁵ .............................. H01J 3/14
[52] U.S. Cl. ................... 250/234; 359/368
[58] Field of Search .......... 250/234, 216, 201.5; 359/368

[56] References Cited

U.S. PATENT DOCUMENTS

| 4,363,962 | 12/1982 | Shida | 250/201.3 |
| 5,081,350 | 1/1992 | Iwasaki et al. | 250/234 |
| 5,140,572 | 8/1992 | Kibune et al. | 369/44.14 |

FOREIGN PATENT DOCUMENTS 62-217218  9/1987  Japan .

Primary Examiner—David C. Nelms
Assistant Examiner—T. Davenport
Attorney, Agent, or Firm—Sughrue, Mion, Zinn, Macpeak & Seas

[57] ABSTRACT

A scanning microscope comprises a sample supporting member on which a sample is supported, a light source which produces a light beam, a light projecting optical device with which an image of the light beam is formed as a small beam spot on the sample, and a light receiving optical device with which the light radiated out of the sample is condensed and an image of the condensed light is formed as a point image. A photodetector detects the point image. A movable member supports at least part of the light projecting optical device and at least part of the light receiving optical device together. The movable member is reciprocally moved such that the beam spot may scan the sample in a one-dimensional scanning direction. The light source is located on the side outward from the movable member. The light projecting optical device is provided with a collimating optical device for collimating the light beam, which has been produced by the light source, on the side outward from the movable member and guiding the collimated light beam to a direction parallel to the scanning direction, and a mirror, which is secured to the movable member and which reflects the collimated light beam towards the sample supporting member.

20 Claims, 4 Drawing Sheets

SCANNING MICROSCOPE AND SCANNING MECHANISM

BACKGROUND OF THE INVENTION

1. Field of the Invention

This invention relates to an optical type scanning microscope. This invention particularly relates to a scanning microscope, wherein an optical means, which irradiates a light beam to a sample, is moved with respect to a sample supporting member, on which the sample is supported, such that the light beam may scan the sample. This invention also relates to a novel scanning mechanism.

2. Description of the Prior Art

Optical type scanning microscopes have heretofore been used. With the scanning microscope, a light beam is converged to a small beam spot on a sample, and the sample is two-dimensionally scanned with the beam spot. The light beam, which has passed through the sample during the scanning, the light beam, which has been reflected from the sample during the scanning, or the fluorescence, which is produced by the sample during the scanning, is detected by a photodetector. An enlarged image of the sample is thereby obtained.

Basically, the scanning microscope comprises:
i) a light source which produces a light beam,
ii) a sample supporting member on which a sample is supported,
iii) a light projecting optical means with which an image of the light beam is formed as a small beam spot on the sample,
iv) a light receiving optical means with which the light beam radiated out of the sample (i.e. the light beam, which has passed through the sample, the light beam, which has been reflected from the sample, or the fluorescence produced by the sample) is condensed, and an image of the condensed light beam is formed as a point image,
v) a photodetector which detects the point image, and
vi) scanning mechanism for two-dimensionally scanning the sample with the beam spot. An example of the scanning microscope is disclosed in Japanese Unexamined Patent Publication No. 62(1987)-217218.

In the conventional optical type scanning microscopes, a mechanism which two-dimensionally deflects a light beam by a light deflector is primarily employed as the scanning mechanism.

However, the scanning mechanism described above has the drawback in that a light deflector, such as a galvanometer mirror or an acousto-optic light deflector (hereinafter referred to as "AOD"), which is expensive, must be used. Also, with the scanning mechanism described above, a light beam is deflected by a light deflector. As a result, the angle of incidence of the deflected light beam upon an objective lens of the light projecting optical means changes momentarily, and aberration is caused to occur. Therefore, the scanning mechanism described above also has the problem in that it is difficult for the objective lens to be designed such that aberration can be eliminated. Particularly, in cases where an AOD is utilized, astigmatism occurs in the light beam radiated out of the AOD. Therefore, in such cases, a special correction lens must be used, and the optical means cannot be kept simple.

In order to eliminate the aforesaid problems, a scanning mechanism has heretofore been proposed wherein a light beam is not deflected but a sample is scanned with the beam spot of the light beam. For example, in U.S. patent application No. 5,081,350, a novel mechanism has been proposed wherein a light projecting optical means and a light receiving optical means are supported on a single movable member, the movable member is moved reciprocally with respect to a sample supporting member, and a beam spot of a light beam is thereby caused to scan a sample.

In such cases, for the purpose of achieving quick scanning, it is advantageous that the light source for producing a light beam to be irradiated to the sample is located on the side outward from the movable member, and the movable member is thereby made light in weight. When the light source for producing a light beam to be irradiated to the sample is thus located on the side outward from the movable member, it is necessary for a means to be utilized for guiding the light beam to part of the light projecting optical means located in the region inside of the movable member. As the means for guiding the light beam to part of the light projecting optical means located in the region inside of the movable member, an optical fiber may be utilized as disclosed in, for example, U.S. Pat. No. 5,081,350.

However, in cases where an optical fiber is utilized as the means for guiding the light beam to part of the light projecting optical means located in the region inside of the movable member, the optical fiber bends as the movable member moves reciprocally, and therefore the amount of the light beam guided through the optical fiber often fluctuates. Also, the amount of the light beam guided through the optical fiber often fluctuates due to vibrations of a fiber coupling, or the like. If the amount of the light beam guided through the optical fiber fluctuates, nonuniformity will occur in a microscope image which is formed by the scanning microscope.

SUMMARY OF THE INVENTION

The primary object of the present invention is to provide a scanning microscope, wherein a movable member is utilized to carry out scanning with a light beam, which is to be irradiated to a sample, and an image of the sample can be formed which image is free of nonuniformity and which has good image quality.

Another object of the present invention is to provide a novel scanning mechanism.

The present invention provides a scanning microscope comprising:
i) a sample supporting member on which a sample is supported,
ii) a light source which produces a light beam,
iii) a light projecting optical means with which an image of said light beam is formed as a small beam spot on said sample,
iv) a light receiving optical means with which the light radiated out of said sample is condensed, and an image of the condensed light is formed as a point image,
v) a photodetector which detects said point image,
vi) a movable member which supports at least part of said light projecting optical means and at least part of said light receiving optical means together, and
vii) a drive means which reciprocally moves said movable member such that said beam spot may scan said sample in a one-dimensional scanning direction,
wherein said light source is located on the side outward from said movable member, and said light projecting optical means is provided with:
a) a collimating optical means for collimating said light beam, which has been produced by said light source, on the side outward from said movable member and guiding the collimated light beam to a direction parallel to said scanning direction, and
b) a mirror, which is secured to said movable member and which reflects said collimated light beam towards said sample supporting member.

In a preferred embodiment of the scanning microscope in accordance with the present invention, said photodetector is located on the side outward from said movable member, and said light receiving optical means is provided with:
1) a mirror for reflecting the light, which has been radiated out of said sample, to a direction parallel to said scanning direction, and
2) a collimating optical means for collimating the light, which has been reflected by said mirror of said light receiving optical means.

In the scanning microscope in accordance with the present invention, the movable member may be reciprocally moved in main scanning directions or in sub-scanning directions. In cases where the movable member is reciprocally moved in sub-scanning directions, the main scanning may be carried out by, for example, reciprocally moving the sample supporting member.

The term "light radiated out of a sample" as used herein means light, which has passed through the sample, light which has been reflected from the sample, the fluorescence which is produced by the sample, or the like.

With the scanning microscope in accordance with the present invention, the light beam, which has been produced by the light source, is collimated by the collimating optical means of the light projecting optical means. The collimated light beam travels in the direction parallel to the scanning direction. Therefore, regardless of the position of the movable member, the light beam impinges from always the same direction and in the collimated state upon the mirror, which is secured to the movable member. As a result, the light beam is reflected from the mirror to the sample supporting member in always the same direction and in the collimated state. Accordingly, the scanning with the light beam can be carried out by the movement of the movable member as in cases where the light source for producing the light beam is secured to the movable member in order to irradiate the light beam to the sample supporting member.

Also, with the scanning microscope in accordance with the present invention, a light guiding means, such as an optical fiber, is not used to guide the light beam to the movable member. Therefore, nonuniformity due to bending or vibration of the light guiding means, or the like, does not occur in a microscope image, which is formed by the scanning microscope.

Additionally, with the scanning microscope in accordance with the present invention, the light source, which produces the light beam, and part (i.e., the collimating optical means) of the light projecting optical means are located on the side outward from the movable member. Particularly, in the aforesaid preferred embodiment of the scanning microscope in accordance with the present invention, the light source, which produces the light beam, part (i.e., the collimating optical means) of the light projecting optical means, the photodetector, and part (i.e., a condensing lens, or the like) of the light receiving optical means are located on the side outward from the movable member. Therefore, the movable member can be kept markedly small in size and markedly light in weight. Accordingly, the speed, at which the movable member moves, can be kept high, and the scanning can be carried out quickly. Also, operations for replacing the movable member by a different member can be carried out easily when, for example, the mode in which the scanning microscope is utilized is to be changed.

In the scanning microscope in accordance with the present invention, the photodetector for detecting the light, which has been radiated out of the sample and has then been condensed by the light receiving optical means, may be supported by the movable member or may be located on the side outward from the movable member. In cases where the photodetector is located on the side optical means which is supported by the movable number, outward from the movable member, the light receiving and the photodetector may be optically coupled by an optical fiber. Alternatively, the mirror and the collimating optical means as in the aforesaid preferred embodiment of the scanning microscope in accordance with the present invention may be utilized. In such cases, nonuniformity due to bending of the optical fiber on the light receiving side, which fiber is connected to the photodetector, or the like, does not occur in the microscope image.

The present invention also provides a scanning mechanism comprising:
i) a material supporting member on which a material to be scanned is supported,
ii) a light source which produces a light beam,
iii) a light projecting optical means with which an image of said light beam is formed as a small beam spot on said material,
iv) a light receiving optical means with which the light radiated out of said material is condensed, and an image of the condensed light is formed as a point image,
v) a photodetector which detects said point image,
vi) a movable member which supports at least part of said light projecting optical means and at least part of said light receiving optical means together, and
vii) a drive means which reciprocally moves said movable member such that said beam spot may scan said material in a one dimensional scanning direction,
wherein said light source is located on the side outward from said movable member, and said light projecting optical means is provided with:
a) a collimating optical means for collimating said light beam, which has been produced by said light source, on the side outward from said movable member and guiding the collimated light beam to a direction parallel to said scanning direction, and
b) a mirror, which is secured to said movable member and which reflects said collimated light beam towards said material supporting member.

In a preferred embodiment of the scanning mechanism in accordance with the present invention, said photodetector is located on the side outward from said movable member, and said light receiving optical means is provided with:
1) a mirror for reflecting the light, which has been radiated out of said material, to a direction parallel to said scanning direction, and 2) a collimating optical means for collimating the light, which has been reflected by said mirror of said light receiving optical means.

In the scanning mechanism in accordance with the present invention, the movable member may be reciprocally moved in main scanning directions or in sub-scanning directions. In cases where the movable member is reciprocally moved in sub-scanning directions, the main scanning may be carried out by, for example, reciprocally moving the material supporting member.

DESCRIPTION OF THE PREFERRED EMBODIMENTS

The present invention will hereinbelow be described in further detail with reference to the accompanying drawings.

Figure 1:
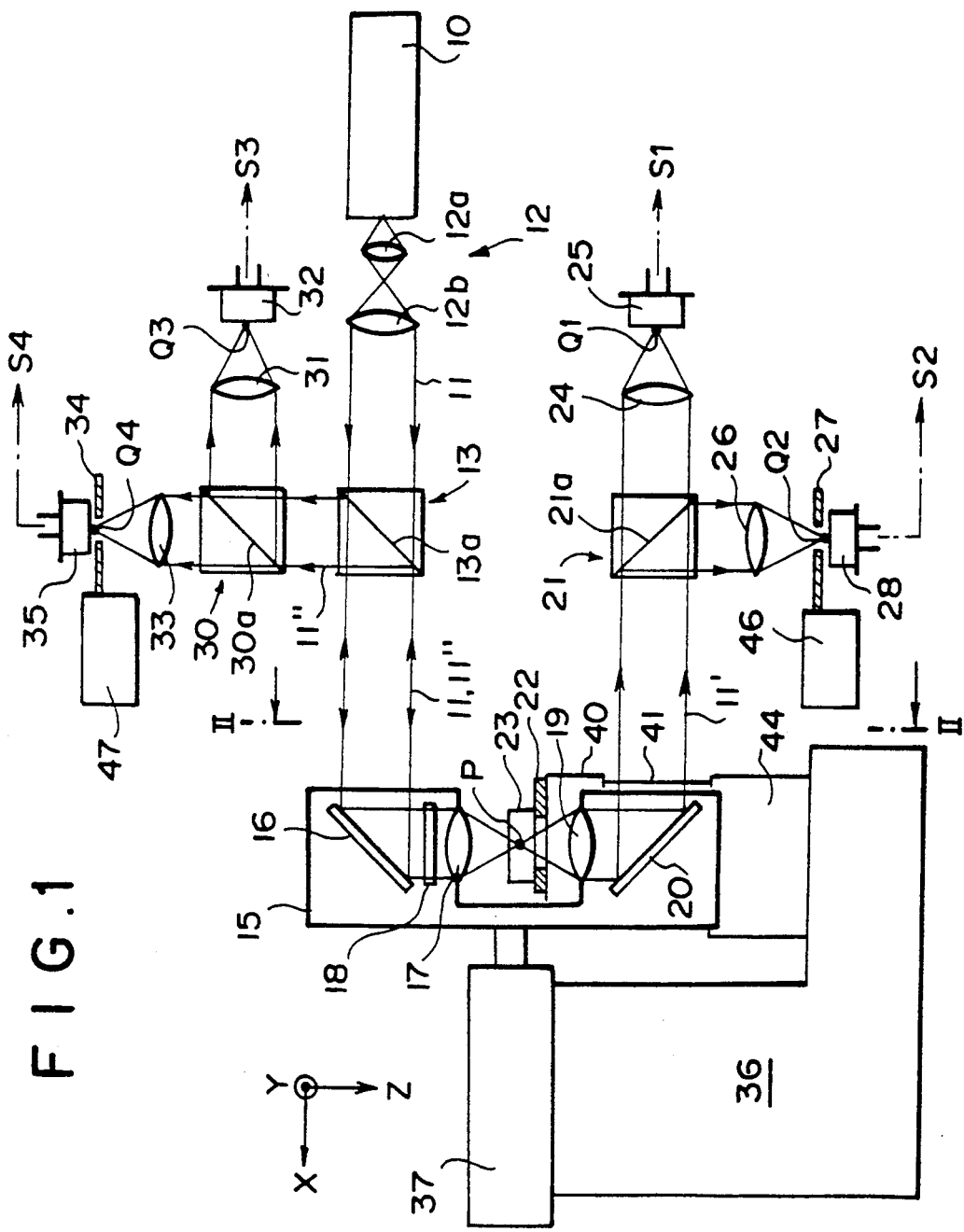
FIG. 1 is a schematic side view showing a first embodiment of the scanning microscope in accordance with the present invention.
Figure 2:
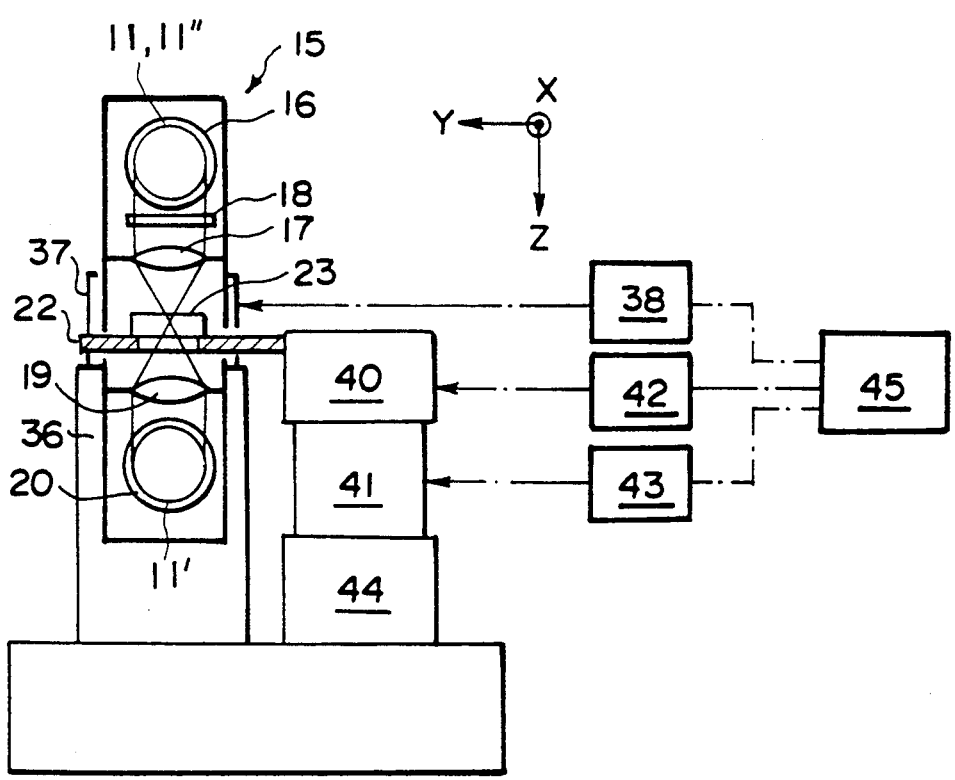
FIG. 2 is a schematic view taken along line II—II of FIG. 1.

FIG. 1 shows a first embodiment of the scanning microscope in accordance with the present invention, which takes on the form of a confocal scanning microscope capable of being utilized both as a transmission type and as a reflection type. FIG. 2 is a schematic view taken along line II—II of FIG. 1. As illustrated, a monochromatic laser 10, which may be constituted of an Ar laser, or the like, produces a laser beam 11, which serves as a light beam to be irradiated to a sample and which has been polarized linearly. The laser beam 11 is collimated by a collimating optical means 12, which comprises lenses 12a and 21b. The laser beam 11, which has been collimated, travels in the direction parallel to the directions indicated by the arrow X, i.e., travels horizontally. The laser beam 11 then passes through a film surface 13a of a polarization beam splitter (hereinafter referred to as "PBS") 13 and impinges upon a mirror 16, which is secured to a movable member 15.

The mirror 16 is secured to the movable member 15 at an angle of 45° with respect to the directions indicated by the arrow X. The laser beam 11 is reflected by the mirror 16 downwardly, i.e., to the direction parallel to the directions indicated by the arrow Z. The movable member 15 supports an objective lens (a condensing lens) 17, which constitutes a light projecting optical means together with the collimating optical means 12. A quarter-wave plate 18 is located between the objective lens 17 and the mirror 16. The movable member 15 also supports an objective lens 19, which constitutes part of a light receiving optical means. The objective lenses 17 and 19 are secured such that their optical axes align with each other. A sample supporting member 22, which is independent of the movable member 15, is located between the objective lenses 17 and 19. Also, a mirror 20 is secured to the movable member 15 such that it may incline at an angle of 45° with respect to the optical axis of the objective lens 19. The mirror 20 reflects a laser beam 11', which has passed through a sample 23 supported by the sample supporting member 22, to a direction parallel to the directions indicated by the arrow X (i.e., in the opposite direction to that along which the laser beam 11 travels).

The laser beam 11, which has been collimated, is condensed by the objective lens 17 and converged to a small beam spot P on the sample 23 (i.e., on the surface of the sample 23 or in the inside of the sample 23), which is supported on the sample supporting member 22. The laser beam 11', which has passed through the sample 23, is collimated by the objective lens 19 and reflected by the mirror 20 to the exterior of the movable member 15. The laser beam 11' then impinges upon a beam splitter (hereinafter referred to as "BS") 21. Part of the laser beam 11' passes through a film surface 21a of the BS 21 and is then condensed by a condensing lens 24. In this manner, a point image Q1 is formed. The amount of light of the point image Q1 is detected by a photodetector 25, which may be constituted of a photodiode, or the like, and which generates a transmitted laser beam detection signal S1 representing the amount of light of the point image Q1. The laser beam 11', which has been reflected by the film surface 21a of the BS 21, is condensed by a condensing lens 26. In this manner, a point image Q2 is formed. The point image Q2 is detected by a photodetector 28 via a confocal aperture plate 27. The photodetector 28 generates a confocal transmitted laser beam detection signal S2 representing the brightness of the point image Q2.

In cases where this embodiment is utilized as the reflection type of scanning microscope, a laser beam 11", which has been reflected by the sample 23, is condensed by the objective lens 17 and then passes through the quarter-wave plate 18. Thereafter, the reflected laser beam 11" is reflected by the mirror 16, and the direction of the optical path of the reflected laser beam 11" is thereby changed by an angle of 90°. The reflected laser beam 11" then follows the same optical path as that of the laser beam 11 and impinges upon the PBS 13. The laser beam 11, which has been polarized linearly, is converted by the quarter-wave plate 18 into a circularly polarized laser beam. When the laser beam 11 is reflected by the sample 23, the direction of circular polarization of the laser beam 11 is reversed. Therefore, when the reflected laser beam 11" passes through the quarter-wave plate 18 and is thereby converted into the linearly polarized laser beam, the direction of polarization of the reflected laser beam 11" shifts by an angle of 90° from the direction of polarization of the laser beam 11. Accordingly, the reflected laser beam 11" is reflected by the film surface 13a of the PBS 13.

The reflected laser beam 11", which has been reflected by the PBS 13, impinges upon a BS 30. Part of the reflected laser beam 11" is reflected by a film surface 30a of the BS 30 and condensed by a condensing lens 31. In this manner, a point image Q3 is formed. The amount of light of the point image Q3 is detected by a photodetector 32, which may be constituted of a photodiode, or the like, and which generates a reflected laser beam detection signal S3 representing the amount of light of the point image Q3.

The reflected laser beam 11", which has passed through the film surface 30a of the BS 30, is condensed by a condensing lens 33. In this manner, a point image Q4 is formed. The point image Q4 is detected by a photodetector 35 via a confocal aperture plate 34. The photodetector 35 generates a confocal reflected laser beam detection signal S4 representing the brightness of the point image Q4.

How the two-dimensional scanning with the beam spot P of the laser beam 11 is carried out will be described hereinbelow.

A laminated piezo-electric device 37 for the main scanning is located between the movable member 15 and a frame 36. The laminated piezo-electric device 37 is operated by a drive electric power received from a piezo-electric device driving circuit 38 and reciprocally moves the movable member 15 at a high speed in the directions indicated by the arrow X. Laminated piezo-electric devices 40 and 41 are located between the sample supporting member 22 and the frame 36. The laminated piezo-electric device 40 is operated by a driving electric power received from a piezo-electric device driving circuit 42 and reciprocally moves the sample supporting member 22 at a high speed in the directions indicated by the arrow Y. In this manner, the sample supporting member 22 is moved with respect to the movable member 15 such that the beam spot P may scan the sample 23 in the sub-scanning directions indicated by the arrow Y. The sub-scanning directions are normal to the main scanning directions indicated by the arrow X. The sample 32 is thus two-dimensionally scanned with the beam spot P of the laser beam 11, and the signals S1, S2, S3, and S4 representing two-dimensional enlarged images of the sample 23 are obtained.

By way of example, the signal S1, S2, S3, or S4 is sampled in accordance with a predetermined pixel clock signal and quantized. Thereafter, the signal thus obtained is then fed into a display device, such as a CRT display device, or an image, reproducing apparatus, such as a light beam scanning recording apparatus. In this manner, the microscope image represented by the signal can be reproduced as a visible image. In such cases, if the signal S2 or S4 is used, the scanning microscope serves as a confocal scanning microscope. If the signal S1 or S3 is used, the scanning microscope serves as a non-confocal scanning microscope.

The upper end of the laminated piezo-electric device 41 is secured to the laminated piezo-electric device 40 for the sub-scanning. The lower end of the laminated piezo-electric device 41 is secured to a coarsely movable stage 44, which is in turn secured to the frame 36. The laminated piezo-electric device 41 is operated by a drive electric power received from a piezo-electric device driving circuit 43 and move the laminated piezo-electric device 40, which supports the sample supporting member 22, in the directions indicated by the arrow Z (i.e., in the directions along which the optical axes of the objective lenses 17 and 19 extend), which directions are normal to the main scanning directions indicated by the arrow X and the sub-scanning directions indicated by the arrow Y. The two-dimensional scanning with the beam spot P is carried out each time the sample supporting member 22 is moved a predetermined distance along the directions indicated by the arrow Z. In this manner, even if the surface of the sample 23 is slightly uneven, only the information at the focusing plane can be detected by the photodetector 35. The signal S4 generated by the photodetector 35 may be stored on a frame memory. In this manner, a signal can be obtained which represents the image information at every focusing plane within the range of movement of the sample 23 along the directions indicated by the arrow Z.

The laser beam 11 impinges upon the mirror 16 from the direction, which is parallel to the directions of movement of the movable member 15, i.e., which is parallel to the main scanning directions indicated by the arrow X. Therefore, regardless of the position of the movable member 15 with respect to the directions indicated by the arrow X, the laser beam 11 is always kept in the collimated state in the space inside of the movable member 15 and such that the center point of the laser beam 11 may coincide with the optical axes of the objective lenses 17 and 19. Also, the laser beam 11' and the reflected laser beam 11" are radiated by the mirrors 20 and 16, respectively, to the same directions as the main scanning directions indicated by the arrow X. Therefore, regardless of the position of the movable member 15 with respect to the directions indicated by the arrow X, the laser beam 11' is always kept in the collimated state and such that the center point of the laser beam 11' may coincide with the optical axes of the lenses 24 and 26. Also, regardless of the position of the movable member 15 with respect to the directions indicated by the arrow X, the reflected laser beam 11" is always kept in the collimated state and such that the center point of the reflected laser beam 11" may coincide with the optical axes of the lenses 31 and 33.

Additionally, the laser 10, part of the light projecting optical means, the means for detecting the laser beam 11', the optical means for converging the laser beam 11', the means for detecting the reflected laser beam 11", and the optical means for converging the reflected laser beam 11" are located on the side outward from the movable member 15. Therefore, the movable member 15 can be kept very small in size and very light in weight. Accordingly, scanning with the laser beam 11 can be carried out quickly, and the time required for the formation of a microscope image can be kept short. Further, a light guiding means, such as an optical fiber, is not located between the laser 10 and the movable member 15, between the movable member 15 and the transmitted laser beam detecting means, and between the movable member 15 and the reflected laser beam detecting means. Therefore, problems can be prevented from occurring in that nonuniformity occurs in the formed image due to, for example, bending of the optical fiber which accompanies the movement of the movable member 15.

A control circuit 45 feeds synchronizing signals to the piezo-electric device driving circuits 38, 42, and 43. The synchronizing signals synchronize the scanning with the beam spot P in the main and sub-scanning directions, and the movement of the sample supporting member 22 in the directions along the optical axis with each other. The coarsely movable stage 44 can be moved a large distance manually or by a drive means in the directions indicated by the arrow Y. By thus moving the sample supporting member 22 with the coarsely movable stage 44, the sample 23 can be easily replaced by a new one. Also, the confocal aperture plates 27 and 34 can be moved in the directions indicated by the arrows X, Y and Z by three-dimensional movement stages 46 and 47, respectively. Therefore, adjustments of the confocal aperture plates 27 and 34, i.e., adjustments of the positions of the confocal aperture plates 27 and 34 with respect to the directions indicated by the arrows X and Y, can be carried out.

Also, the position of the aperture of the confocal aperture plate 27 or 34 with respect to the directions indicated by the arrow Z can be corrected when the position, to which the laser beam 11' is converged by the condensing lens 26, or the position, to which the reflected laser beam 11" is converged by the condensing lens 33, is changed in accordance with the thickness of the sample 23, or the like.

The diameters of the apertures of the confocal aperture plates 27 and 34 should preferably be made adjustable. In such cases, the sharpness and the brightness of the formed image becomes adjustable. In particular, in cases where the weak fluorescence produced by the sample 23 is detected, compromises between the possible sharpness of the formed image and the amount of fluorescence capable of being detected are often considered. For example, it is desired that as much fluorescence as possible can be detected even if the sharpness of the formed image becomes slightly bad. Therefore, in such cases, it is particularly advantageous that the diameters of the apertures of the confocal aperture plates 27 and 34 are adjustable.

Figure 3:
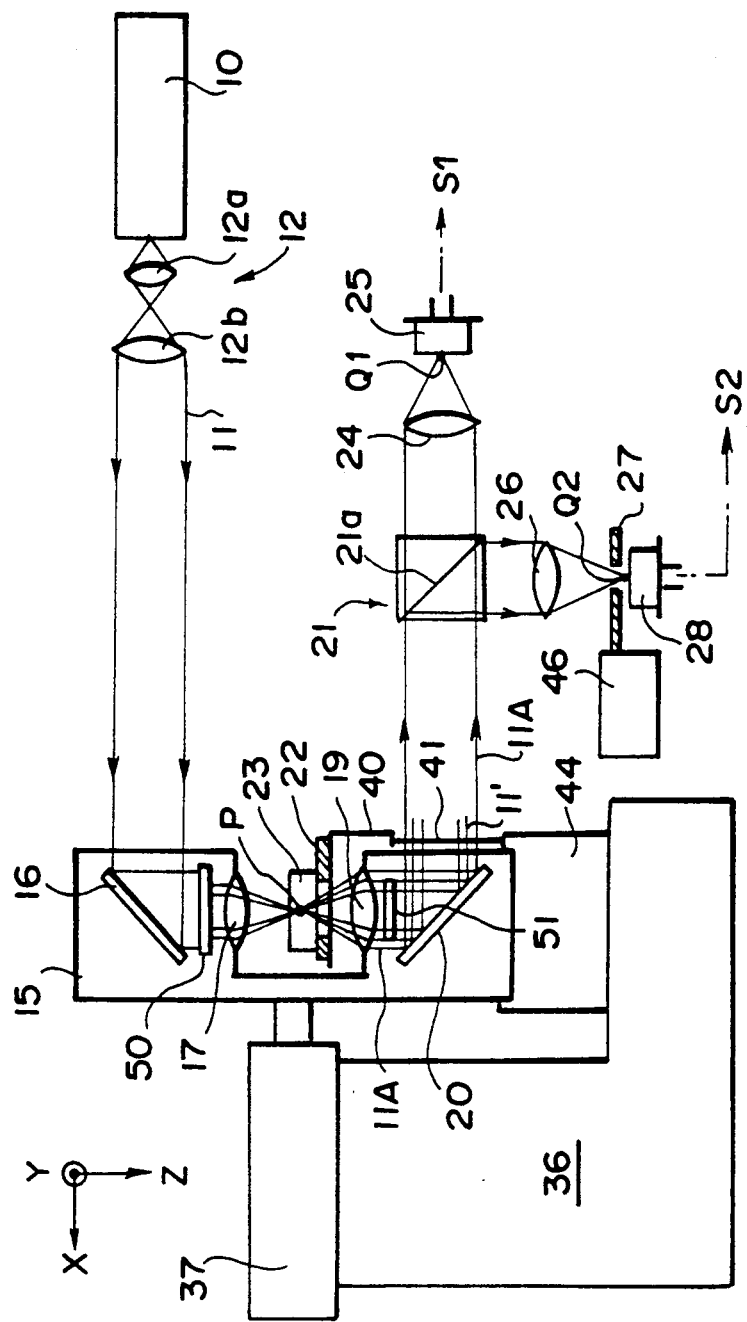
FIG. 3 is a schematic side view showing a second embodiment of the scanning microscope in accordance with the present invention.

A second embodiment of the scanning microscope in accordance with the present invention will be described hereinbelow with reference to FIG. 3. In FIG. 3, similar elements are numbered with the same reference numerals with respect to FIG. 1. (This also applies to FIG. 4.)

The embodiment shown in FIG. 3 takes on the form of a phase contrast microscope. A ring stop (an annular band-like plate) 50, which converts the laser beam 11 into an annular band-like laser beam, is located between the mirror 16 and the objective lens 17 in the movable member 15. An annular band-like phase plate 51 is located between the objective lens 19 and the mirror 20. The annular band-like phase plate 51 gives a phase lag of $\lambda/4$ to the laser beam (an undiffracted laser beam) 11', which has passed through the sample 23. In this embodiment, the transmitted laser beam (a diffracted laser beam) 11A, which has been diffracted by the sample 23 and imparted with a phase lag of approximately $\lambda/4$, passes primarily the side outward from the annular band-like phase plate 51. The diffracted laser beam 11A and the undiffracted laser beam 11' are condensed by the condensing lenses 24 and 26 and interfere with each other.

Therefore, in this embodiment, the brightness of the point image Q1 and the brightness of the point image Q2 change in accordance with the phase of the diffracted laser beam 11A (i.e. in accordance with the phase information at the part of the sample 23 exposed to the laser beam 11). Accordingly, the laser beam detection signals S1 and S2 corresponding to the phase information of the sample 23 are generated by the photodetectors 25 and 28.

In the first and second embodiments described above, the movable member 15 should preferably be releasable by utilizing an appropriate means such that the movable member 15 may be replaced by a new movable member or by a movable member which supports thereon an optical means for realizing a different mode of the formation of a microscope image. In such cases, each movable member serves as a probe for each mode of the formation of a microscope image, and the scanning microscope allows the selection of a mode of the formation of a microscope image by the replacement of the probe.

For the purpose of changing the mode of the formation of a microscope image, the probe (i.e., the movable member) may be replaced by a different one in the manner described above. Alternatively, the optical elements for each mode of the formation of a microscope image (the ring stop 50 and the annular band-like phase plate 51 in the embodiment of FIG. 3) may be releasably supported by the movable member.

The movable member 15 or the optical elements in the movable member 15 may be made releasable for the purpose of changing the mode of the formation of a microscope image in the manner described above or for other purposes. For example, several sets of the objective lenses 17 and 19 having different numerical apertures NA may be prepared and releasably supported by the movable member 15. Alternatively, a plurality of movable members 15, 15, . . . , which respectively supports such sets of the objective lenses 17 and 19, may be prepared. In such cases, objective lenses having a higher numerical aperture NA can be used for the purpose of obtaining a high resolution. Also, even though the resolution is sacrificed to some extent, the working distance (i.e., the distance between the sample supporting member 22 and the lens) can be kept large when the sample 23 is thick.

Figure 4:
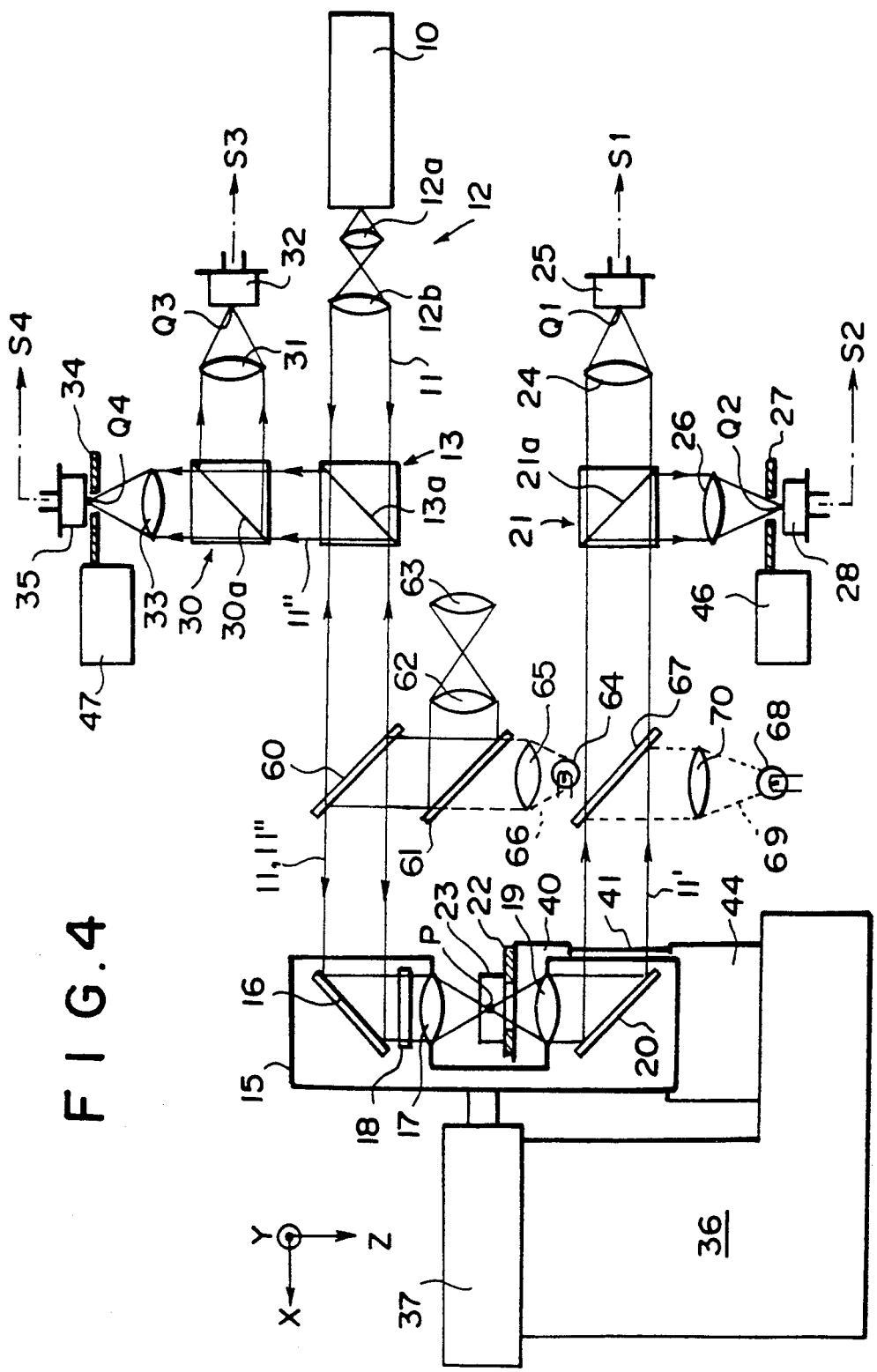
FIG. 4 is a schematic side view showing a third embodiment of the scanning microscope in accordance with the present invention.

With the scanning microscope in accordance with the present invention, the mode of the formation of a microscope image can be changed by the replacement or the addition of the optical elements located on the side outward from the movable member 15. FIG. 4 shows a third embodiment of the scanning microscope in accordance with the present invention, wherein the mode of the formation of a microscope image can be changed in such a manner.

In the embodiment of FIG. 4, a semi-transparent mirror 60 is inserted into the optical path of the laser beam 11 and the reflected laser beam 11''. The reflected laser beam 11'', which has been reflected by the semi-transparent mirror 60, is then reflected by a semi-transparent mirror 61. Thereafter, the reflected laser beam 11'' passes through an auxiliary lens 62, which is located in order to lower the numerical aperture NA of the objective lens 17, and impinges upon an eyepiece 63. A light source 64, which produces a reflection light beam 66, and a collimating lens 65, which condenses and collimates the reflection light beam 66, are located on the rear side of the semi-transparent mirror 61.

The optical elements 60 through 65 should preferably be secured to a single mount. Also, the semi-transparent mirror 60 should preferably be capable of moving between the position, that is inserted into the optical path of the laser beam 11 and the reflected laser beam 11'', and the position retracted from the optical path. When the semi-transparent mirror 60 is inserted into the optical path of the laser beam 11 and the reflected laser beam 11'', a conventional, non-scanning type of microscope image can be observed through the eyepiece 63. In such cases, when the operation of the laser 10 is ceased, only the conventional type of microscope image can be observed. When the laser 10 is kept operating, both the conventional type of microscope image and the scanning type of microscope image can be obtained simultaneously. In cases where both the conventional type of microscope image and the scanning type of microscope image are to be obtained simultaneously, it is necessary that a filter, which filters out light having the wavelength equal to the wavelength of the laser beam 11, is located in front of the eyepiece 63, and that band-pass filters, which transmit only light having the wavelength equal to the wavelength of the laser beam 11, are located in front of the photodetectors 25, 28, 32, and 35.

The image of the reflection type of sample 23 can be formed in the manner described above. In cases where the image of the transmission type of sample 23 is to be formed, a semi-transparent mirror 67 is inserted into the optical path of the laser beam 11'. A transmission light beam 69 is produced by a light source 68. The light beam 69 is condensed by a condensing lens 70 is reflected by the semi-transparent mirror 67 towards the mirror 20.

Instead of the laminated piezo-electric devices being used to move the movable member 15 and the sample supporting member 22, scanning techniques utilizing a voice coil, a tuning fork, natural oscillation of a solid with ultrasonic waves, or the like, may be utilized to move the movable member 15 and the sample supporting member 22.

The scanning mechanisms employed in the aforesaid embodiments of the scanning microscope in accordance with the present invention are also applicable when the scanning is to be carried out in apparatuses other than microscopes. For example, the scanning mechanisms described above may be employed when the scanning is to be carried out during the writing of information in memories, the reading of information from memories, and the detection of video or audio signals from recording media.

What is claimed is:

1. A scanning microscope, comprising:
   i) a sample supporting member on which a sample is supported,
   ii) a light source which produces a light beam,
   iii) light projecting optical means with which an image of said light beam is formed as a beam spot on said sample,
   iv) light receiving optical means with which the light radiated out of said sample is condensed, and an image of the condensed light is formed as a point image,
   v) a photodetector which detects said point image,
   vi) a movable member which supports at least part of said light projecting optical means and at least part of said light receiving optical means together, and
   vii) drive means which reciprocally moves said movable member such that said beam spot scans said sample in a one-dimensional scanning direction,
   wherein said light source is located on a side outwardly from said movable member, and
   said light projecting optical means comprises:
   a) collimating optical means for collimating said light beam, which has been produced by said light source, on the side outwardly from said movable member and guiding the collimated light beam in a direction parallel to said scanning direction, and
   b) a mirror which is secured to said movable member and which reflects said collimated light beam towards said sample supporting member.

2. A scanning microscope, comprising:
   i) a sample supporting member on which a sample is supported,
   ii) a light source which produces a light beam,
   iii) light projecting optical means with which an image of said light beam is formed as a beam spot on said sample,
   iv) light receiving optical means with which the light radiated out of said sample is condensed, and an image of the condensed light is formed as a point image,
   v) a photodetector which detects said point image,
   vi) a movable member which supports at least part of said light projecting optical means and at least part of said light receiving optical means together, and
   vii) drive means which reciprocally moves said movable member such that said beam spot scans said sample in a one-dimensional scanning direction,
   wherein said light source is located on a side outwardly from said movable member, said light projecting optical means comprising:
   a) collimating optical means for collimating said light beam, which has been produced by said light source, on the side outwardly from said movable member and guiding the collimated light beam in a direction parallel to said scanning direction, and
   b) a mirror which is secured to said movable member and which reflects said collimated light beam towards said sample supporting member, and
   wherein said photodetector is located on the side outwardly from said movable member, and
   said light receiving optical means comprises:
   1) a mirror for reflecting the light, which has been radiated out of said sample, in a direction parallel to said scanning direction, and
   2) collimating optical means for collimating the light which has been reflected by said mirror of said light receiving optical means.

3. A scanning microscope as defined in claim 1, wherein said movable member is reciprocally movable in main scanning directions.

4. A scanning microscope as defined in claim 1, wherein said movable member is reciprocally movable in sub-scanning directions.

5. A scanning microscope as defined in claim 1, wherein drive means is provided which reciprocally moves said sample supporting member in scanning directions, which are normal to the scanning directions along which said movable member is movable reciprocally.

6. A scanning microscope as defined in claim 5, wherein drive means is provided which reciprocally moves said sample supporting member in directions normal to said scanning directions, along which said sample supporting member is movable reciprocally, and to said scanning directions, along which said movable member is movable reciprocally.

7. A scanning microscope as defined in claim 1, wherein said light source comprises a laser.

8. A scanning mechanism, comprising:
   i) a material supporting member on which a material to be scanned is supported,
   ii) a light source which produces a light beam,
   iii) light projecting optical means with which an image of said light beam is formed as a beam spot on said material,
   iv) light receiving optical means with which the light radiated out of said material is condensed, and an image of the condensed light is formed as a point image,
   v) a photodetector which detects said point image,
   vi) a movable member which supports at least part of said light projecting optical means and at least part of said light receiving optical means together, and
   vii) drive means which reciprocally moves said movable member such that said beam spot scans said material in a one-dimensional scanning direction,
   wherein said light source is located on a side outwardly from said movable member, and
   said light projecting optical means comprises:
   a) collimating optical means for collimating said light beam, which has been produced by said light source, on the side outwardly from said movable member and guiding the collimated light beam in a direction parallel to said scanning direction, and b) a mirror which is secured to said movable member and which reflects said collimated light beam towards said material supporting member.

9. A scanning mechanism, comprising:
i) a material supporting member on which a material to be scanned is supported,
ii) a light source which produces a light beam,
iii) light projecting optical means with which an image of said light beam is formed as a beam spot on said material,
iv) light receiving optical means with which the light radiated out of said material is condensed, and an image of the condensed light is formed as a point image,
v) a photodetector which detects said point image,
vi) a movable member which supports at least part of said light projecting optical means and at least part of said light receiving optical means together, and
vii) drive means reciprocally moves said movable member such that said beam spot scans said material in a one-directional scanning direction,
wherein said light source is located on a side outwardly from said movable member, and
said light projecting optical means comprises:
a) collimating optical means for collimating said light beam, which has been produced by said light source, on the side outwardly from said movable member and guiding the collimated light beam in a direction parallel to said scanning direction, and
b) a mirror which is secured to said movable member and which reflects said collimated light beam towards said material supporting member,
wherein said photodetector is located on the side outwardly from said movable member, and
said light receiving optical means comprises:
1) a mirror for reflecting the light, which has been radiated out of said material, in a direction parallel to said scanning direction, and
2) collimating optical means for collimating the light which has been reflected by said mirror of said light receiving optical means.

10. A scanning mechanism as defined in claim 8, wherein said movable member is reciprocally movable in main scanning directions.

11. A scanning mechanism as defined in claim 8, wherein said movable member is reciprocally movable in sub-scanning directions.

12. A scanning mechanism as defined in claim 8, wherein drive means is provided which reciprocally moves said material supporting member in scanning directions, which are normal to the scanning directions along which said movable member is movable reciprocally.

13. A scanning mechanism as defined in claim 12, wherein drive means is provided which reciprocally moves said material supporting member in directions that are normal to said scanning directions, along which said material supporting member is movable reciprocally, and to said scanning directions, along which said movable member is movable reciprocally.

14. A scanning mechanism as defined in claim 8 wherein said light source comprises a laser.

15. A scanning microscope according to claim 1, wherein said light receiving optical means includes a mirror for reflecting light having been radiated out of said sample, said light being reflected in a direction parallel to said scanning direction.

16. A scanning microscope according to claim 1, wherein said light receiving optical means includes collimating optical means for collimating the light having been radiated out of said sample.

17. A scanning mechanism according to claim 8, wherein said light receiving optical means includes a mirror for reflecting light having been radiated out of said sample, said light being reflected in a direction parallel to said scanning direction.

18. A scanning mechanism according to claim 8, wherein said light receiving optical means includes collimating optical means for collimating the light having been radiated out of said sample.

19. A scanning microscope, comprising:
means for supporting a sample;
means for producing a light beam;
means for forming an image of said light beam as a beam spot on said sample;
light receiving optical means for condensing the light radiated out of said sample, and for forming an image of the condensed light as a point image;
means for detecting said point image;
a movable member for supporting at least part of said image forming means and at least part of said light receiving optical means together; and
means for reciprocally moving said movable member such that said beam spot scans said sample in a one-dimensional scanning direction,
wherein said beam producing means is located outwardly from said movable member, and said image forming means comprises:
means for collimating said light beam which has been produced by said light producing means, on the side outwardly from said movable member, and guiding the collimated light beam in a direction parallel to said scanning direction, and
means, secured to said movable member, for reflecting said collimated light beam towards said sample supporting means.

20. A scanning mechanism, comprising:
means for supporting a material to be scanned;
means for producing a light beam;
means for forming an image of said light beam as a beam spot on said material;
means for condensing the light radiated out of said material, and forming an image of the condensed light as a point image;
means for detecting said point image;
a movable member which supports at least part of said image forming means and at least part of said light condensing means together; and
means for reciprocally moving said movable member such that said beam spot scans said material in a one-dimensional scanning direction;
wherein said light beam producing means is located on a side outwardly from said movable member, and said image forming means comprises:
means for collimating said light beam produced by said light beam producing means, on the side outwardly from said movable member, and guiding the collimated light beam in a direction parallel to said scanning direction, and
means, secured to said movable member, for reflecting said collimated light beams toward said material supporting means.

* * * * *